US010283986B2

(12) United States Patent
Thomas et al.

(10) Patent No.: US 10,283,986 B2
(45) Date of Patent: May 7, 2019

(54) METHODS AND DEVICES FOR PRESENTING AUXILIARY ENERGY DELIVERY INDICIA ON A DISPLAY

(71) Applicant: Motorola Mobility LLC, Chicago, IL (US)

(72) Inventors: Kathryn Thomas, Chicago, IL (US); Ling Li, Buffalo Grove, IL (US); Kiley Coombe, Chicago, IL (US); Boby Iyer, Elmhurst, IL (US)

(73) Assignee: Motorola Mobility LLC, Chicago, IL (US)

( * ) Notice: Subject to any disclaimer, the term of this patent is extended or adjusted under 35 U.S.C. 154(b) by 96 days.

(21) Appl. No.: 15/592,908

(22) Filed: May 11, 2017

(65) Prior Publication Data

US 2018/0331550 A1  Nov. 15, 2018

(51) Int. Cl.
*H02J 7/00* (2006.01)
*G06F 3/0481* (2013.01)

(52) U.S. Cl.
CPC ........ *H02J 7/0047* (2013.01); *G06F 3/04817* (2013.01); *H02J 7/007* (2013.01); *H02J 2007/0096* (2013.01)

(58) Field of Classification Search
USPC ......................................... 320/107
See application file for complete search history.

(56) References Cited

U.S. PATENT DOCUMENTS 9,007,017 B2    4/2015  Howard
2010/0106353 A1*  4/2010  Watson ................. B60K 6/365
                                                    701/22
2011/0039605 A1*  2/2011  Choi ..................... H02J 7/0047
                                                    455/573

* cited by examiner

*Primary Examiner* — Bryce M Aisaka
(74) *Attorney, Agent, or Firm* — Philip H. Burrus, IV

(57) ABSTRACT

An electronic device includes one or more processors, a display, a primary energy storage device, and an auxiliary energy delivery device. The auxiliary energy delivery device selectively delivers energy to the primary energy storage device. When this occurs, the one or more processors present an icon at least partially superimposed upon a graphical representation of the primary energy storage device on the display.

20 Claims, 8 Drawing Sheets

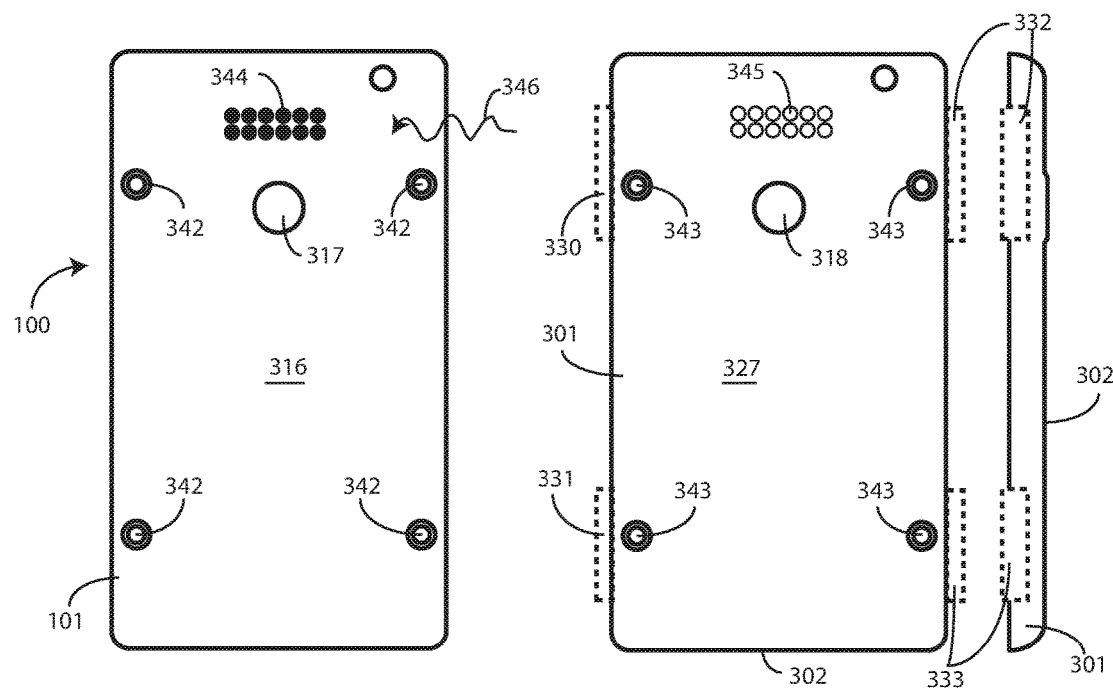
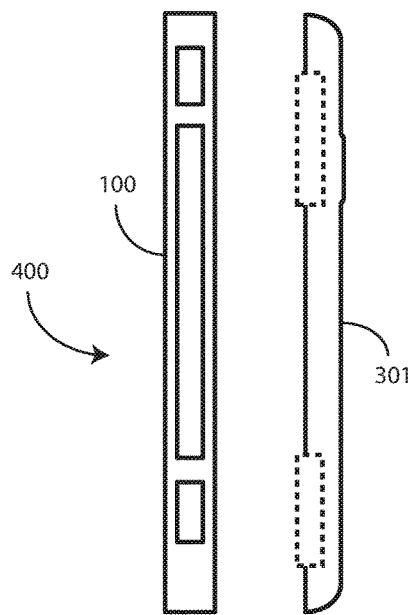 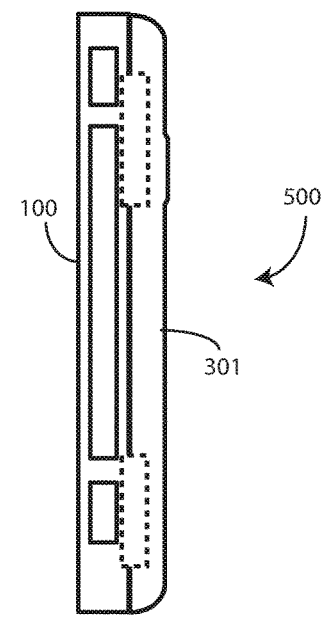
FIG. 3
FIG. 4   FIG. 5

METHODS AND DEVICES FOR PRESENTING AUXILIARY ENERGY DELIVERY INDICIA ON A DISPLAY

BACKGROUND

Technical Field

This disclosure relates generally to electronic devices, and more particularly to user interfaces of electronic devices.

Background Art

The use of portable electronic devices, including smartphones, tablet computers, gaming devices, and other devices, is becoming ubiquitous. People use such devices to communicate with friends, family, and colleagues, manage calendars and contact lists, browse and explore the Internet, and play games. These devices present information related to these applications on a display.

As the technology associated with such devices has improved, so too have the displays. High-resolution liquid crystal and other displays are capable of presenting information in brilliant color and with sharp detail. At the same time, as technology has advanced the devices have tended to become smaller. It can sometimes challenging for a user to conveniently view some types of information on some displays. It would be advantageous to have an improved user interface for presenting information on displays of electronic devices.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 3 illustrates another explanatory system in accordance with one or more embodiments of the disclosure.

FIG. 4 illustrates another explanatory system, with one embodiment of an attachment detached from an electronic device in accordance with one or more embodiments of the disclosure.

FIG. 5 illustrates the explanatory system of FIG. 4, but with the attachment coupled to the electronic device in accordance with one or more embodiments of the disclosure.

Figure 1:
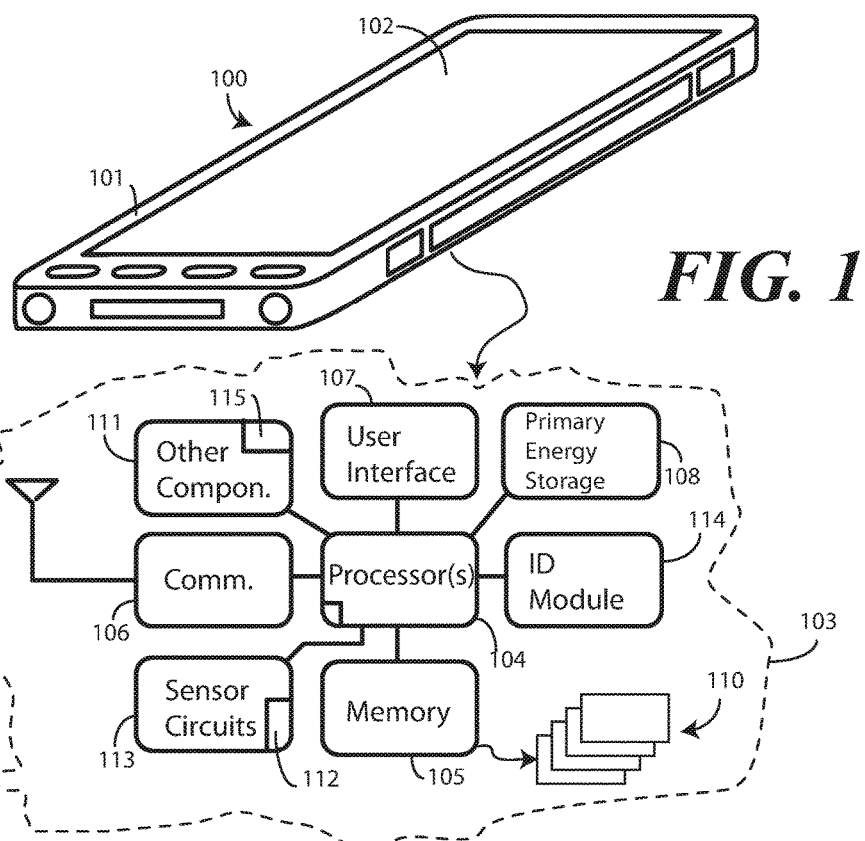
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to the presentation of a visual indicator indicating that an auxiliary energy delivery device is delivering energy to the primary energy storage device of an electronic device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of presenting icons or other visual indicia that is at least partially superimposed upon various graphical representations as described herein. The non-processor circuits may include, but are not limited to, a radio receiver, a radio transmitter, signal drivers, clock circuits, power source circuits, and user input devices. As such, these functions may be interpreted as steps of a method to perform the presentation of visual indicators that at least partially overlap graphical representations as described below. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an efficient, succinct, and convenient indicator for the display of an electronic device that indicates when an auxiliary energy delivery device, such as an auxiliary battery, a power supply, a other electronic device, charger, supercapacitor, or other energy storage device, is delivering energy to the primary energy storage device operating in an electronic device. For example, where an electronic device is a smartphone that includes a lithium-ion or lithium-polymer electrochemical cell in a battery for a primary energy storage device, auxiliary energy delivery devices can deliver supplemental energy to the primary energy storage device to increase the overall "run time" of the smartphone. Advantageously, embodiments of the disclosure provide a quick indicator alerting the user to conditions where the auxiliary energy delivery device is delivering energy to the primary energy storage device.

Illustrating by example, in one or more embodiments an electronic device includes one or more processors, a display, and a primary energy storage device such as an electrochemical cell. An auxiliary energy delivery device, such as another battery, a power supply, or a charger, is operable to selectively deliver energy to the primary energy storage device.

In one or more embodiments, a sensor circuit operable with the one or more processors detects energy being transferred from the auxiliary energy delivery device to the primary energy storage device. For example, a current sensor operable with the one or more processors can determine when the auxiliary energy delivery device is delivering a charging current to the primary energy storage device.

In one or more embodiments, when this occurs, to alert the user to the fact that the auxiliary energy delivery device is delivering energy to the primary energy storage device, the one or more processors present a visual indicator on the display. The visual indicator indicates that the auxiliary energy delivery device is delivering energy to the primary energy storage device.

The visual indicator can take one of numerous forms. In one embodiment, the visual indicator comprises an icon that is at least partially superimposed upon a graphical representation of the primary energy storage device. For example, where the primary energy storage device is an electrochemical cell, the graphical representation of the primary energy storage device can comprise an image of a battery. In one or more embodiments, the icon comprises one of a plus sign, a lightning bolt, and image of a plug for an alternating current outlet, a turbine image, or other image. Accordingly, in one or more embodiments a plus sign is at least partially superimposed upon an image of a battery.

In one embodiment, the plus sign (or other icon) is superimposed within the image of the battery. For instance, the plus sign can be placed within the perimeter boundary of the image of the battery. In one or more embodiments, the plus sign is only partially superimposed on the image of the battery. Illustrating by example, in one embodiment the plus sign overlaps, but is offset from, the image of the battery. Other configurations for the visual indicator will be described below with reference to FIGS. 7-12. Still others will be obvious to those of ordinary skill in the art having the benefit of this disclosure.

Turning now to FIG. 1, illustrated therein is one explanatory electronic device 100 in accordance with one or more embodiments of the disclosure. The electronic device 100 of FIG. 1 is shown as a portable electronic device. For ease of illustration, the electronic device 100 of FIG. 1 is shown illustratively as a smartphone. However, the electronic device 100 can take other forms as well, including as a palm top computer, a gaming device, a laptop computer, a multimedia player, and so forth. Still other examples of electronic devices will be obvious to those of ordinary skill in the art having the benefit of this disclosure.

As will be described in more detail below, in one or more embodiments the electronic device 100 is selectively attachable and detachable from an auxiliary energy delivery device. The auxiliary energy delivery device can be a traditional charging device such as a charger or power supply. However, in one or more embodiments, the auxiliary energy delivery device is an electrochemical cell disposed within an attachment that mechanically and electrically couples to the electronic device 100. The attachment becomes a "module" that attaches to the electronic device 100 to increase functionality or the range of features in one or more embodiments.

In one or more embodiments, the electronic device 100 includes a housing 101. The housing 101 can include one or more housing portions, such as a first housing portion and a second housing portion. In this illustrative embodiment, the housing 101 is disposed about the periphery of a display 102, thereby defining a major face of the electronic device 100.

A block diagram schematic 103 of the electronic device 100 is also shown in FIG. 1. In one embodiment, the electronic device 100 includes one or more processors 104. The one or more processors 104 are operable with the display 102 and other components of the electronic device 100. The one or more processors 104 can include a microprocessor, a group of processing components, one or more ASICs, programmable logic, or other type of processing device. The one or more processors 104 can be operable with the various components of the electronic device 100. The one or more processors 104 can be configured to process and execute executable software code to perform the various functions of the electronic device 100.

A storage device, such as memory 105, can optionally store the executable software code used by the one or more processors 104 during operation. The memory 105 may include either or both static and dynamic memory components, may be used for storing both embedded code and user data. The software code can embody program instructions and methods to operate the various functions of the electronic device 100, and also to execute software or firmware applications and modules. The one or more processors 104 can execute this software or firmware, and/or interact with modules, to provide device functionality.

In one or more embodiments the electronic device 100 includes a display 102, which may optionally be touch-sensitive. In one embodiment where the display 102 is touch-sensitive, the display 102 can serve as a primary user interface 107 of the electronic device 100. Users can deliver user input to the display 102 of such an embodiment by delivering touch input from a finger, stylus, or other objects disposed proximately with the display. In one embodiment, the display 102 is configured as an organic light emitting diode (OLED) display. However, it should be noted that other types of displays would be obvious to those of ordinary skill in the art having the benefit of this disclosure. In one embodiment, the display 102 includes an electroluminescent layer or light-emitting diode (LED) backlighting layer disposed beneath the display 102 to project light through the display 102. The display 102 can adaptively present text, graphics, images, user actuation targets, data, and controls along the display surface.

In this illustrative embodiment, the electronic device 100 also includes an optional communication circuit 106 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 106 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 106 can include wireless communication circuitry, one of a receiver, a transmitter, or transceiver, and one or more antennas.

The one or more processors 104 can be responsible for performing the primary functions of the electronic device 100. For example, in one embodiment the one or more processors 104 comprise one or more circuits operable with one or more user interface devices, which can include the display 102, to present presentation information to a user. The executable software code used by the one or more processors 104 can be configured as one or more modules 110 that are operable with the one or more processors 104. Such modules 110 can store instructions, control algorithms, and so forth. While these modules 110 are shown as software stored in the memory 105, they can be hardware components or firmware components integrated into the one or more processors 104 as well.

A primary energy storage device 108 can serve as a principal energy delivery device for the electronic device 100. In one or more embodiments, the primary energy storage device 108 comprises a rechargeable battery having one or more electrochemical cells. The electrochemical cells can be any of lithium-ion cells, lithium-polymer cells, nickel-metal-hydride cells, or other types of rechargeable cells.

In one or more embodiments, the primary energy storage device 108 includes a memory 105. Information can be written to the memory 105, including the rated discharge voltage of the one or more cells of the primary energy storage device 108, the voltages of the one or more cells of the primary energy storage device 108 when charging commences, and when and how frequently the one or more cells of the primary energy storage device 108 should be charged. In one or more embodiments, the memory 105 of the primary energy storage device 108 can be an electrically erasable programmable read only memory, although other suitable types of memory devices can also be used with the primary energy storage device 108.

Other components 111 can be included with the electronic device 100. The other components 111 can be operable with the one or more processors 104 and can include input and output components associated with a user interface 107, such as power inputs and outputs, audio inputs and outputs, and/or mechanical inputs and outputs. The other components 111 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 111 can include an energy management system 115 configured to regulate energy delivery to the primary energy storage device 108. Illustrating by example, the energy management system 115 can include a charging circuit that is electrically coupled to the primary energy storage device 108. When an auxiliary energy delivery device, which will be described in more detail below, delivers a charging current to the energy management system 115, it can regulate levels of current, whether current is flowing, and so forth. The energy management system 115 can include, for example, a control circuit configured to control the amount of charging current that flows to the primary energy storage device 108. Additionally, the control circuit can also be configured to monitor a discharge profile, charging profile, charging temperature, discharge temperature, and other characteristics of the electrochemical cells of the primary energy storage device 108. Still other components will be obvious to those of ordinary skill in the art having the benefit of this disclosure.

One or more sensor circuits 113 are operable with the one or more processors 104 in one or more embodiments. These sensor circuits 113 can include one or more energy delivery sensors 112. In one or more embodiments, the energy delivery sensors 112 are operable to detect when, and optionally how much, energy is being delivered from an auxiliary energy delivery device to the primary energy storage device 108.

Illustrating by example, the energy delivery sensors 112 can include a sense resistor, Hall effect sensor, or other sensor to detect current flowing from the auxiliary energy delivery device to the primary energy storage device 108. The energy delivery sensors 112 can optionally include current control devices as well, such as a field effect transistor and a diode. The one or more processors 104 can optionally initiate, terminate, and/or control energy delivery from the auxiliary energy delivery device to the primary energy storage device 108 using these components.

The energy delivery sensors 112 can include other components such as a thermistor.

Where a thermistor is included, the one or more processors 104 can monitor a temperature of electrochemical cells in the primary energy storage device 108 using the thermistor. Still other components suitable for inclusion with the energy delivery sensors 112 will be obvious to those of ordinary skill in the art having the benefit of this disclosure.

In operation, when an auxiliary energy delivery device is electrically coupled to the primary energy storage device 108, a charging current can flow from the auxiliary energy delivery device to the primary energy storage device 108 to charge the one or more cells disposed therein. The one or more processors 104 can monitor the charging current that is being transferred to the primary energy storage device 108 using the energy delivery sensors 112.

In one or more embodiments, the primary energy storage device 108 can optionally include its own independent energy management circuit. Where such an energy management circuit is included, many of the functions of the one or more processors 104 and the energy delivery sensors 112 can be offloaded to, and embedded completely within, the primary energy storage device 108.

The one or more sensor circuits 113 can also be configured to sense or determine physical parameters indicative of conditions in an environment about the electronic device 100. Illustrating by example, the physical sensors can include devices for determining information such as motion, bearing, location, acceleration, orientation, proximity to people and other objects, incident light amounts, and so forth. The one or more sensor circuits 113 can include various combinations of microphones, location detectors, motion sensors, physical parameter sensors, temperature sensors, barometers, proximity sensor components, proximity detector components, wellness sensors, touch sensors, cameras, audio capture devices, and so forth.

The one or more sensor circuits 113 can also include a touch pad sensor, a touch screen sensor, a capacitive touch sensor, and one or more switches. The one or more sensor circuits 113 can also include audio sensors and video sensors (such as a camera). The one or more sensor circuits 113 can also include motion detectors, such as one or more accelerometers or gyroscopes. The motion detectors can detect movement, and direction of movement, of the electronic device 100 by a user. The one or more sensor circuits 113 can also be used to detect gestures. For example, the other one or more sensor circuits 113 can include one or more proximity sensors that detect the gesture of a user waving a hand above the display 102. In yet another embodiment, the accelerometer can detect gesture input from a user lifting, shaking, or otherwise deliberately moving the electronic device 100. It should be clear to those of ordinary skill in the art having the benefit of this disclosure that additional sensors can be included as well. Moreover, other types of sensor circuits 113 will be obvious to those of ordinary skill in the art having the benefit of this disclosure.

An optional identification module 114 can be configured to determine whether an auxiliary energy delivery device, the details of which will be described below with reference to subsequent figures, is coupled to the electronic device 100. In one or more embodiments, the identification module 114 can detect not only whether an auxiliary energy delivery device is coupled to the electronic device 100, but the type of auxiliary energy delivery device as well. For example, where the auxiliary energy delivery device comprises a power supply, the identification module 114 can determine the type of power supply, output voltage, maximum current, and so forth. Similarly, where the auxiliary energy delivery device comprises an attachment that mechanically, magnetically, or otherwise couples to the electronic device 100, the identification module 114 can determine the type of energy delivery device disposed within the attachment, the amount of energy it can delivery, at what current and voltage, and so forth. Other examples of identification techniques will be obvious to those of ordinary skill in the art having the benefit of this disclosure.

Illustrating by example, where the auxiliary energy delivery device is configured as an attachment that mechanically couples to the electronic device 100, in one embodiment the identification module 114 is operable with multiple mechanical connectors to determine which are engaged to identify the attachment. Where the attachment is electrically coupled to the electronic device 100, in one embodiment the identification module 114 can identify the attachment by exchanging electrical signals with a control circuit of the attachment. These electrical signals can include information about the auxiliary energy delivery device such as rated charging limit, rated discharging limit, type of cell, profiles of discharge, voltage profiles, predefined usage criteria, and other information.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
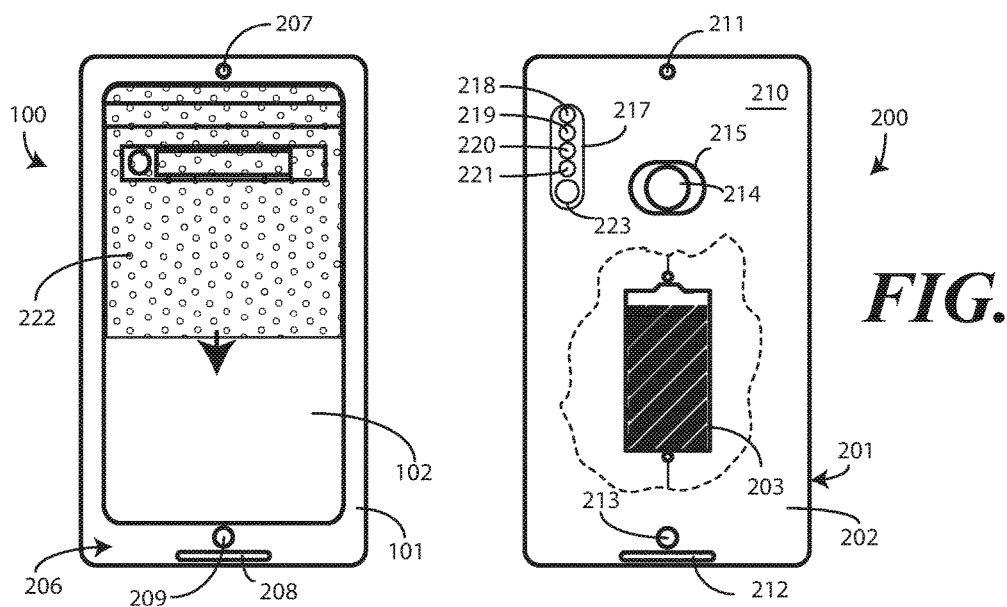
FIG. 2 illustrates one explanatory system in accordance with one or more embodiments of the disclosure.

Turning now to FIG. 2, illustrated therein is one explanatory system 200 in accordance with one or more embodiments of the disclosure. In one or more embodiments, the system 200 includes one of an electronic device 100 and an attachment 201. In one or more embodiments, the attachment 201 can be selectively attached to, or detached from, the electronic device 100 or an electronic device module.

As the principal components of the electronic device 100 were explained above with reference to FIG. 1, attention will now be directed to the attachment 201. In one or more embodiments, the attachment includes a housing 202. In one or more embodiments, the housing 202 is selectively attachable to the electronic device 100 by one or more coupling devices.

In one or more embodiments, the housing 202 of the attachment 201 can be mechanically attached to the electronic device 100. For example, mechanical clasps for the attachment 201 can be configured to wrap about, or engage, the housing 101 of the electronic device 100, thereby retaining the attachment 201 against a surface of the housing 101. Such clasps permit the attachment 201 to be completely detached from the electronic device 100 and treated as an accessory.

In another embodiment, when not in use, the attachment 201 may be mechanically retained to the electronic device 100 by a lanyard or similar device. Such a configuration helps to prevent inadvertent loss of the attachment 201 when detached from the housing 101 of the electronic device 100.

In yet another embodiment, the attachment 201 may be coupled to the electronic device 100 by a hook and slider mechanism so as to be detachable from the housing 101 yet non-detachable from the electronic device 100 itself. Other attachment mechanisms include magnetic couplings, snaps, protective casing couplings, boot couplings, static attachment connectors, vertical locators, horizontal locators, and the like. Some of these various mechanical configurations will be illustrated in more detail below. These mechanical embodiments are intended to be illustrative only. As an alternate to mechanical attachments, the attachment 201 can be attached to the housing 101 using static adhesion, mechanical suction, or in other ways.

In one or more embodiments, the attachment 201 comprises at least one auxiliary energy delivery device 203. In the illustrative embodiment of FIG. 2, the auxiliary energy delivery device 203 comprises a thermal electrochemical cell. Examples of electrochemical cells include a lithium-ion cell, a lithium-polymer cell, or a nickel-metal-hydride cell. Still other types of electrochemical cells will be obvious to those of ordinary skill in the art having the benefit of this disclosure. The auxiliary energy delivery device 203 can include one or multiple electrochemical cells. Where multiple electrochemical cells are included, they can be coupled in series, in parallel, or combinations thereof.

In some embodiments, the attachment 201 will include only the auxiliary energy delivery device 203, which is carried by the housing 202. In other embodiments, the attachment 201 can include mechanical actuators, control circuits, memory devices, energy sensors, current sensors, safety circuits, and other components.

In one or more embodiments, the electronic device 100 and the attachment 201 can even include complementary or common components. For example, the electronic device 100 and attachment 201 may both include components for receiving user input, such as loudspeakers, microphones, earpiece speakers, and the like. When such components are included in the attachment 201 and the electronic device 100, a user can—for example—deliver voice input to a microphone disposed in the electronic device 100 or the attachment 201. An electrical connection therebetween can deliver user input received by the attachment 201 to the electronic device 100.

In the illustrative embodiment of FIG. 2, some features visible in the front side 206 of the electronic device 100 include an earpiece speaker 207, a loudspeaker 208, a microphone 209, and of course, the display 102. To facilitate optimal interaction with a user, in one or more embodiments the backside 210 of the attachment 201 can also include an earpiece speaker 211, a loudspeaker 212, and microphone 213. In an alternative embodiment, the attachment 201 may simply include apertures to port or channel acoustic, visible, or other signals to an earpiece speaker, microphone, or camera disposed on the backside of the electronic device 100.

The attachment 201 can be equipped with additional features as well. Illustrating by example, in one or more embodiments the attachment 201 can include a camera 214 or other device to enhance electronic device operation. The camera 214 can be carried on the housing 202 of the attachment 201 to provide an enhanced feature for the electronic device 100 in one or more embodiments. In other embodiments where the electronic device 100 may include its own rear-facing camera, the camera 214 of the attachment 201 may be accompanied by an aperture 215 to allow a sight line for the rear-facing camera of the electronic device 100. These various options are included to demonstrate the numerous features and devices that can be incorporated into the attachment 201 beyond just the auxiliary energy delivery device 203. However, as noted above, in some embodiments the attachment 201 will carry only the auxiliary energy delivery device 203 and any corresponding energy delivery circuitry. The various combinations and permutations of features to include within the attachment 201 beyond the auxiliary energy delivery device 203 will be obvious to those of ordinary skill in the art having the benefit of this disclosure.

In one or more embodiments, the attachment 201 also includes an energy capacity indicator 217 that is operable with the auxiliary energy delivery device 203. In this illustrative embodiment, the energy capacity indicator 217 comprises a plurality of lights 218,219,220,221, each of which is configured as a light emitting diode. In one embodiment the energy capacity indicator 217 is to present a visible indication to the user that is indicative of the amount of energy stored in the auxiliary energy delivery device 203 when a button 223 is pressed. The energy capacity indicator 217 may be configured to convey other information as well, such as indicating that energy sharing is occurring with the primary energy storage device 108.

Where this energy capacity indicator 217 is not included, a user can determine the state of charge of one or both of the primary energy storage device (108) or the auxiliary energy delivery device 203 in other ways. Illustrating by example, the user may pull down the curtain 222 of FIG. 2 to obtain supplemental information about the electronic device 100 and its components. Other techniques will be obvious to those of ordinary skill in the art having the benefit of this disclosure.

Turning now to FIG. 3, illustrated therein are examples of various ways in which an attachment 301 can be coupled to an electronic device 100 in accordance with one or more embodiments of the disclosure. As noted above, in one or more embodiments of the disclosure, the attachment 301 can be coupled to the electronic device 100 by mechanical, magnetic, suction, static, and other techniques.

As shown in FIG. 3, the backside 316 of the electronic device 100 can interface with the front side 327 of one explanatory attachment 301 configured in accordance with one or more embodiments of the disclosure. The backside 316 of the electronic device 100 defines a major face of the electronic device 100. The front side 327 of the attachment 301, which defines a major face of the attachment 301, can be selectively attachable to this major face of the electronic device 100 in one or more embodiments.

As shown in FIG. 3, the backside 316 of the electronic device 100 includes a rear-facing camera 317. To reduce the number of components and to simplify construction of the attachment 301, in this illustrative embodiment the attachment 301 includes an aperture 318 through which light may pass to the rear-facing camera 317 when the attachment 301 is coupled to the back side 316 of the electronic device 100.

As before, the attachment 301 includes a housing 302 that carries one or more electrochemical cells.

In one or more embodiments, the housing 302 of the attachment 301 can be mechanically attached to the electronic device 100 or an electronic device module by one or more coupling devices. In one illustrative embodiment, the coupling devices comprise mechanical clasps 330,331,332, 333 that are configured to wrap about, or engage, the housing 101 of the electronic device 100, thereby retaining the attachment 301 against the major surface defined by the back side 316 of the housing 101. Such mechanical clasps 330,331,332,333 permit the attachment 301 to be completely detached from the electronic device 100 and treated as a separate accessory. In FIG. 4, the attachment 301 is shown detached from the electronic device 100, while in FIG. 5 the attachment 301 is shown attached to the electronic device 100 to form a system 500.

Other coupling systems may be used instead of, or in conjunction with, the mechanical clasps 330,331,332,333. Illustrating by example, the backside 316 of the electronic device 100 can include one or more alignment features 342 configured and placed to mate with complementary mating features 343 on the front side 327 of the attachment 301. In one or more embodiments, the alignment features 342 and complementary mating features 343 are magnetic such that the front side 327 of the attachment 301 can be magnetically adhered to the backside 316 of the electronic device 100. Attachments configured in accordance with one or more embodiments of the disclosure can be coupled to electronic devices in other ways as well. These include snaps, protective casing couplings, boot couplings, static attachment connectors, vertical locators, horizontal locators, static adhesion devices, mechanical suction devices, or other devices.

In one embodiment the backside 316 of the electronic device 100 includes a connector array 344. The connector array 344 is located and configured to mate with a mating connector array 345 on the front side 327 of the attachment 301. Electrical signals and/or a charging current 346 can be delivered from the auxiliary energy delivery device (203) disposed within the attachment 301 to the primary energy storage device (108) using the connector array 344 and the mating connector array 345. Illustrating by example, in one or more embodiments the one or more processors (104) of the electronic device 400 can selectively actuate the delivery of energy, voltage, and/or current from the auxiliary energy delivery device (203) to the primary energy storage device (108).

As noted above, in one or more embodiments, a sensor circuit, e.g., the energy delivery sensors (112) of FIG. 1, which is operable with the one or more processors (104) of the electronic device 100, detects energy being transferred from the auxiliary energy delivery device (203) to the primary energy storage device (108). For example, a current sensor operable with the one or more processors (104) can determine when the auxiliary energy delivery device (203) is delivering a charging current (346) to the primary energy storage device (108).

Figure 6:
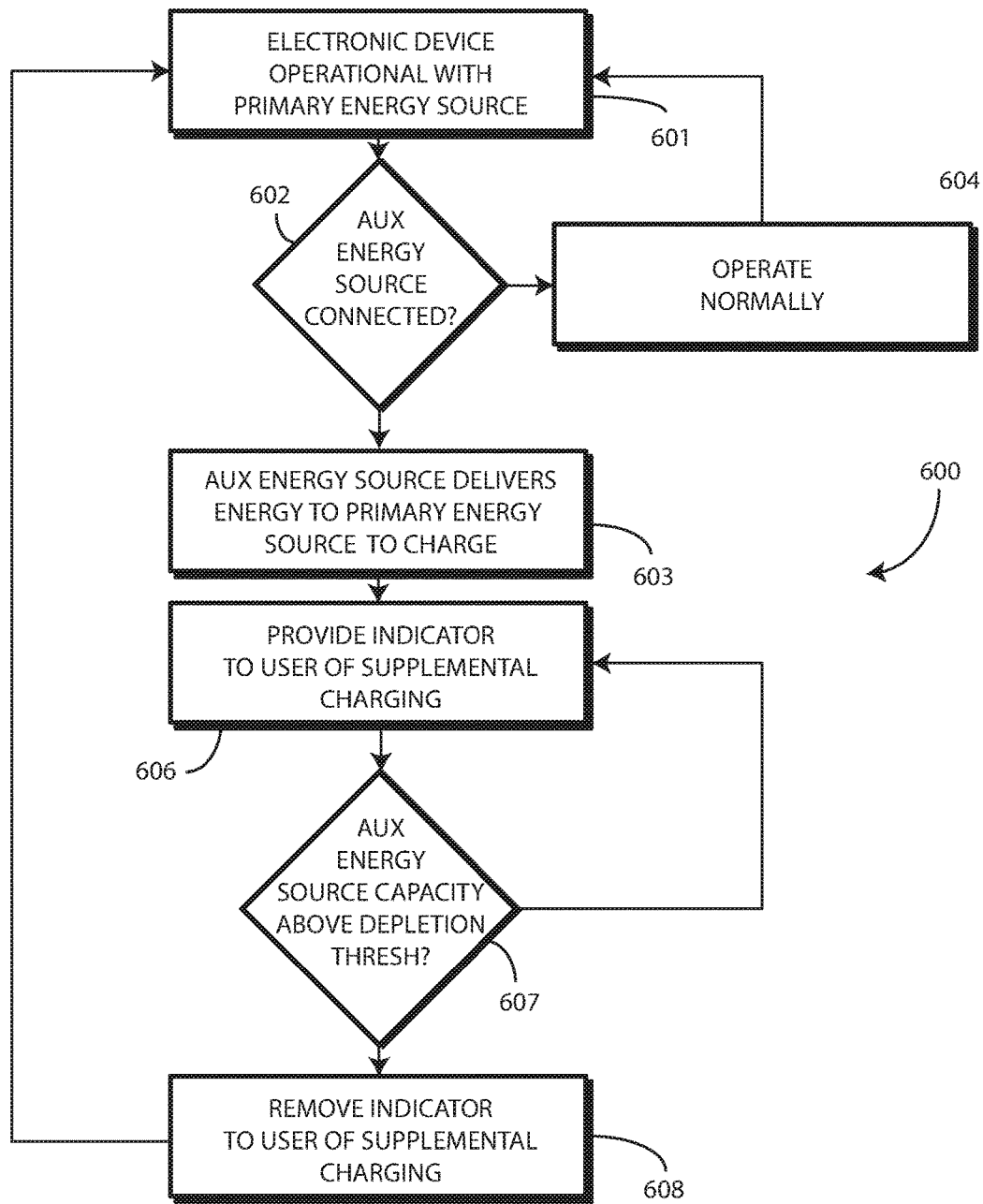
FIG. 6 illustrates one explanatory method in accordance with one or more embodiments of the disclosure.

In one or more embodiments, when this occurs, to alert the user to the fact that the auxiliary energy delivery device (203) is delivering energy to the primary energy storage device (108), the one or more processors (104) present a visual indicator on the display (102) of the electronic device 100. The visual indicator indicates that the auxiliary energy delivery device (203) is delivering energy to the primary energy storage device (108). Turning now to FIG. 6, illustrated therein is one method 600 for doing just this in accordance with one or more embodiments of the disclosure.

Beginning at step 601, the method 600 includes providing an electronic device (100). In one or more embodiments, the electronic device (100) includes a display (102), one or more processors (104), and a primary energy storage device (108) such as one or more electrochemical cells.

At decision 602, the method 600 includes detecting, with one or more processors (104) of an electronic device (100), that an auxiliary energy delivery device (203) is electrically coupled to a primary energy storage device (108) of the electronic device (100). Illustrating by example, where the electronic device (100) includes a connector array (344), the one or more processors (104) can detect that the auxiliary energy delivery device (203) is electrically coupled to the primary energy storage device (108) when a mating connector array (345) is electrically coupled to the connector array (344). Similarly, the one or more processors (104) can detect that the auxiliary energy delivery device (203) is electrically coupled to the primary energy storage device (108) via electrical signals and/or a charging current (346) delivered from the auxiliary energy delivery device (203) to the primary energy storage device (108) using the connector array (344) and the mating connector array (345). Other techniques for determining that the auxiliary energy delivery device (203) is electrically coupled to the primary energy storage device (108) will be obvious to those of ordinary skill in the art having the benefit of this disclosure.

Where the auxiliary energy delivery device (203) is electrically coupled to the primary energy storage device (108), the method proceeds to step 603. Where the auxiliary energy delivery device (203) is not electrically coupled to the primary energy storage device (108), the electronic device (100) functions normally at step 604.

At step 603, the method 600 detects, with a sensor circuit, that the auxiliary energy delivery device (203) is delivering energy to the primary energy storage device (108). Illustrating by example, in one or more embodiments step 603 comprises detecting, with a sensor circuit operable with the one or more processors (104) of the electronic device (100), a charging current (346) flowing from the auxiliary energy delivery device (203) to the primary energy storage device (108).

At step 606, the method 600 comprises presenting, with the one or more processors (104), a visual indicator on a display (102) of the electronic device (100). In one or more embodiments, the visual indicator indicates that the auxiliary energy delivery device (203) is delivering energy to the primary energy storage device (108). In one or more embodiments, the visual indicator is presented at step 606 only when the charging current (346) is flowing from the auxiliary energy delivery device (203) to the primary energy storage device (108).

The visual indicator presented at step 606 can take one of numerous forms. In one embodiment, the visual indicator presented at step 606 comprises an icon that is at least partially superimposed upon a graphical representation of the primary energy storage device. For example, where the primary energy storage device is an electrochemical cell, the graphical representation of the primary energy storage device can comprise an image of a battery. In one or more embodiments, the icon comprises one of a plus sign, a lightning bolt, and image of a plug for an alternating current outlet, a turbine image, or other image. Accordingly, in one or more embodiments a plus sign is at least partially superimposed upon an image of a battery.

In one embodiment, the plus sign presented at step 606 is only partially superimposed within the image of the battery. Illustrating by example, in one embodiment the plus sign overlaps, but is offset from, the image of the battery. In another embodiment, the plus sign is indented into a concave recess created in the image of the battery. Other configurations for the visual indicator will be described below with reference to FIGS. 7-12. Still others will be obvious to those of ordinary skill in the art having the benefit of this disclosure.

At decision 607, the method 600 determines, with one or more processors (104) of the electronic device (100), whether the amount of energy stored in the auxiliary energy delivery device (203) has fallen below a predefined threshold. Where the auxiliary energy delivery device (203) comprises a charger or power supply, decision 607 can be omitted. However, where the auxiliary energy delivery device (203) comprises an electrochemical cell, such as a lithium-ion or lithium-polymer cell, there will be a predefined threshold, such as 3.8 volts in a single cell application, where the auxiliary energy delivery device (203) has insufficient energy to charge the primary energy storage device (108). Accordingly, in one or more embodiments decision 607 comprises determining that a voltage of the auxiliary energy delivery device has fallen below a predefined voltage threshold.

Where this occurs, at step 608, in one embodiment the method 600 comprises removing, with the one or more processors (104), the visual indicator from a display (102) of the electronic device (100). In one or more embodiments, the removal of the visual indicator indicates that the auxiliary energy delivery device (203) is no longer delivering energy to the primary energy storage device (108).

Figure 7:
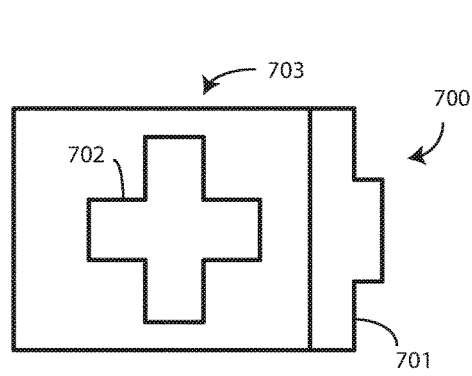
FIG. 7 illustrates one explanatory graphical representation in accordance with one or more embodiments of the disclosure.

Turning now to FIGS. 7-11, illustrated therein are various visual indicators configured in accordance with one or more embodiments of the disclosure. Beginning with FIG. 7, in this illustrative embodiment the presented indicia 700 includes a graphical representation 701 of the primary energy storage device (108) and a visual indicator 702 that is fully superimposed thereon. In this embodiment, the graphical representation 701 of the primary energy storage device (108) is an image of a battery. As shown in FIG. 7, the visual indicator 702 is a plus sign, which has been illustrated as an icon. In this embodiment, the visual indicator 702 has been superimposed upon the graphical representation 701 of the primary energy storage device (108), i.e., image of the battery. In this illustrative embodiment, the plus sign has been situated such that it is bounded by a perimeter 703 of the image of the battery.

Figure 8:
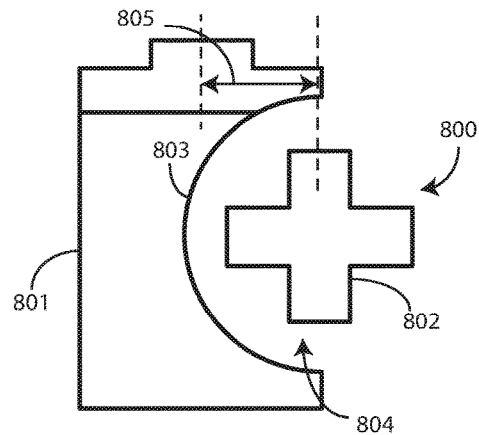
FIG. 8 illustrates another explanatory graphical representation in accordance with one or more embodiments of the disclosure.

Turning now to FIG. 8, illustrated therein is another example of presented indicia 800 that indicates that an auxiliary energy delivery device (203) is delivering energy to a primary energy storage device (108). In this illustrative embodiment, as before, the presented indicia 800 comprise a graphical representation 801 of the primary energy storage device (108) and a visual indicator 802. In this embodiment, the graphical representation 801 of the primary energy storage device (108) again comprises an image of a battery, while the visual indicator 802 comprises a plus sign.

In this embodiment, the visual indicator 802 overlaps 804, but is offset 805 from, the graphical representation 801 of the primary energy storage device (108). As shown, in this embodiment the visual indicator 802 indents the graphical representation 801 of the primary energy storage device (108) due to the fact that it is situated in a concave recess 803 created in the image of the battery. Said differently, a linear side of the image of the battery (shown in FIG. 7) has been replaced with a concave recess 803 into which the visual indicator 802 indents.

Figure 9:
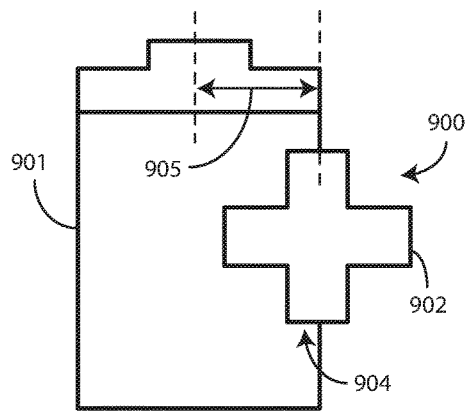
FIG. 9 illustrates another explanatory graphical representation in accordance with one or more embodiments of the disclosure.

Turning now to FIG. 9, illustrated therein is another example of presented indicia 900 that indicates that an auxiliary energy delivery device (203) is delivering energy to a primary energy storage device (108). In this illustrative embodiment, the presented indicia 900 again comprise a graphical representation 901 of the primary energy storage device (108) and a visual indicator 902. As before, the graphical representation 901 of the primary energy storage device (108) again comprises an image of a battery, while the visual indicator 902 comprises a plus sign.

In this embodiment, the visual indicator 902 is disposed at least partially within the graphical representation 901 of the primary energy storage device (108). As shown, the visual indicator 902 overlaps 904, but is offset 905 from, the graphical representation 901 of the primary energy storage device (108). Rather than including a concave recess (803), as was the case in FIG. 8, here the visual indicator 902 is simply atop the graphical representation 901 of the primary energy storage device (108).

Figure 10:
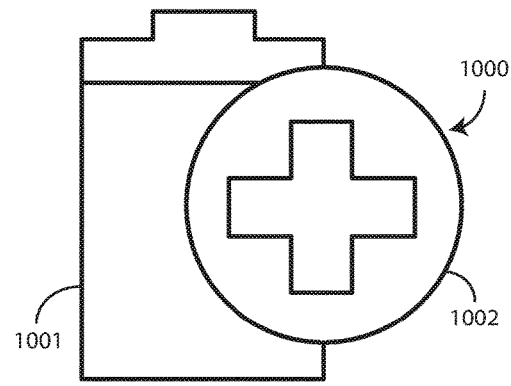
FIG. 10 illustrates yet another explanatory graphical representation in accordance with one or more embodiments of the disclosure.

Turning now to FIG. 10, illustrated therein is another example of presented indicia 1000 that indicates that an auxiliary energy delivery device (203) is delivering energy to a primary energy storage device (108). In this illustrative embodiment, the presented indicia 1000 again comprise a graphical representation 1001 of the primary energy storage device (108). The visual indicator 1002 of this embodiment comprises an icon that includes a plus sign circumscribed with a circle.

In this embodiment, the visual indicator 1002 is presented in a way that it is at least partially superimposed upon the graphical representation 1001 of the primary energy storage device (108). In this illustrative embodiment, the visual indicator 1002 overlaps an edge of the graphical representation 1001 of the primary energy storage device (108).

Figure 11:
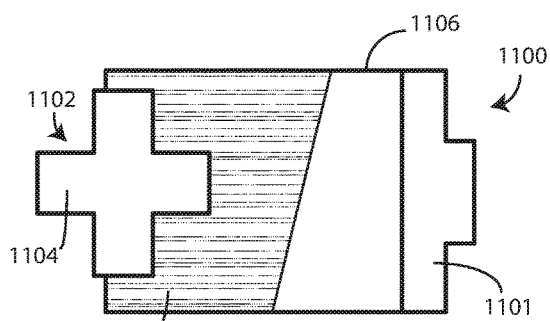
FIG. 11 illustrates still another explanatory graphical representation in accordance with one or more embodiments of the disclosure.

Turning now to FIG. 11, illustrated therein is another example of presented indicia 1100 that indicates that an auxiliary energy delivery device (203) is delivering energy to a primary energy storage device (108). In this illustrative embodiment, the presented indicia 1100 again comprise a graphical representation 1101 of the primary energy storage device (108). The visual indicator 1102 of this embodiment comprises an icon 1104 that is configured as a plus sign.

In this embodiment, the icon 1104 is partially superimposed upon the graphical representation 1101 of the primary energy storage device (108). In this illustrative embodiment, the icon 1104 overlaps an end of the graphical representation 1101 of the primary energy storage device (108). As shown, the icon 1104 is only partially disposed within an outer boundary 1106 of the graphical representation 1101 of the primary energy storage device (108).

In the illustrative embodiment of FIG. 11, the graphical representation 1101 of the primary energy storage device (108) also indicates, by partially or completely visually filling the graphical representation with an indicator 1107, the state of charge of the primary energy storage device (108). This technique could be applied to any of the embodiments of FIGS. 7-10 as well. Where this technique is not used, a user can determine the state of charge of one or both of the primary energy storage device (108) or the auxiliary energy delivery device (203) in other ways. Illustrating by example, the user may pull down the curtain (222) of FIG. 2 to obtain supplemental information about the electronic device (100) and its components. Other techniques will be obvious to those of ordinary skill in the art having the benefit of this disclosure.

Figure 12:
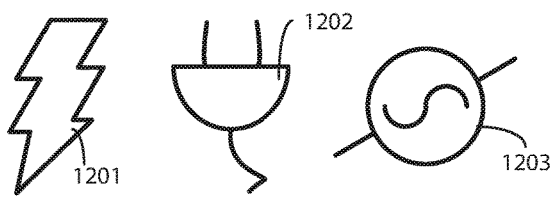
FIG. 12 illustrates various icons in accordance with one or more embodiments of the disclosure.

The examples of FIGS. 7-11 each employ a plus sign as the visual indicator. However, embodiments of the disclosure are not so limited. Turning now to FIG. 12, illustrated therein are alternate icons 1201,1202,1203 that can indicate that an auxiliary energy delivery device (203) is delivering current to a primary energy storage device (108). Icon 1201 comprises a lightning bolt image. Icon 1202 comprises an image of a plug for an alternating current outlet. Icon 1203 comprises an image of a turbine. These are examples only, as numerous other icons will be obvious to those of ordinary skill in the art having the benefit of this disclosure.

Figure 13:
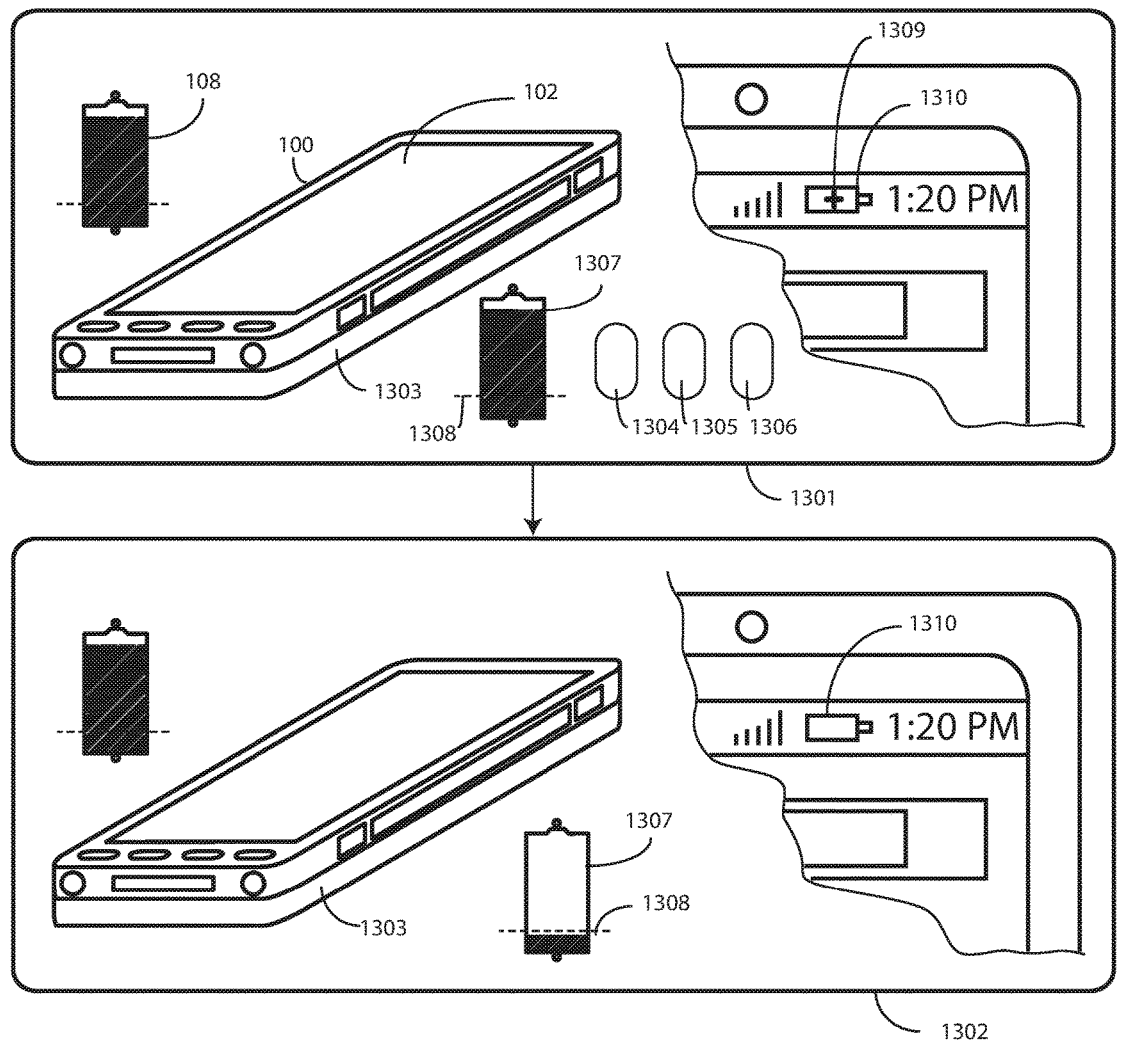
FIG. 13 illustrates one or more method steps in accordance with one or more embodiments of the disclosure.

Turning now to FIG. 13, illustrated therein are one or more method steps 1301,1302 in accordance with one or more embodiments of the disclosure. Beginning at step 1301, an electronic device 100 is shown. The electronic device 100 includes one or more processors (104), a display 102 that is operable with the one or more processors (104), and a primary energy storage device 108 that is operable to power the one or more processors (104). In this embodiment, the primary energy storage device 108 is an electrochemical cell.

An auxiliary energy delivery device 1303 is coupled to the electronic device 100. In one embodiment, the auxiliary energy delivery device 1303 comprises a power supply 1304. In another embodiment, the auxiliary energy delivery device 1303 comprises a charger 1305. In yet another embodiment, the auxiliary energy delivery device 1303 comprises another electronic device 1306. In this illustrative embodiment, the auxiliary energy delivery device 1303 comprises an electrochemical cell 1307 that is operable to selectively deliver energy to the primary energy storage device 108.

As shown at step 1301, the electrochemical cell 1307 of the auxiliary energy delivery device 1303 has energy stored therein that exceeds a predefined threshold 1308 that is sufficient to continue the delivery of energy to the primary energy storage device 108. In one embodiment where the electrochemical cell 1307 is a single, lithium-polymer cell, this predefined threshold is about 3.8 volts.

At step 1301, as the energy stored in the electrochemical cell 1307 exceeds the predefined threshold 1308, and the electrochemical cell 1307 is delivering energy to the primary energy storage device 108, the one or more processors (104) present an icon 1309 at least partially superimposed upon a graphical representation 1310 of the primary energy storage device 108 on the display 102 when the electrochemical cell 1307 delivers the energy to the primary energy storage device 108. In this embodiment, the icon 1309 is fully disposed within an outer boundary of the graphical representation 1310 of the primary energy storage device 108. In other embodiments, as noted above, the icon 1309 is only partially disposed within an outer boundary of the graphical representation 1310 of the primary energy storage device 108.

Thus, at step 1301, the one or more processors (104) detect a charging current (346) flowing from the auxiliary energy delivery device 1303 to the primary energy storage device 108 of the electronic device 100. Accordingly, the one or more processors (104) present, on the display 102 of the electronic device 100, a plus sign at least partially within an image of a battery to indicate the auxiliary energy delivery device 1303 is delivering energy to the primary energy storage device 108.

Turning to step 1302, the stored energy in the electrochemical cell 1307 has fallen below the predefined threshold 1308. In one or more embodiments, the one or more processors (104) of the electronic device detect this. When this is detected, the one or more processors (104) then remove the icon 1309 from the graphical representation 1310 of the primary energy storage device 108 in response to determining the amount of energy stored in the auxiliary energy delivery device 1303 has fallen below the predefined threshold 1308. This alerts the user to the fact that the electrochemical cell 1307 in the auxiliary energy delivery device 1303 requires recharging.

Embodiments of the disclosure contemplate that charging efficiency of the primary energy storage device 108 can be increased when the primary energy storage device 108 is charged to a level below full capacity. Illustrating by example, most modern portable electronic devices employ lithium-based cells for operation. Lithium-ion technology is a popular rechargeable cell technology that is prevalent in many mobile devices. The energy density of lithium-ion cells, which is measured in units of energy per volume (watt-hours/liter), is highly dependent upon the densities of the active material coatings of the anode and cathode disposed within the cell. A higher density coating on the anode and cathode generally increases the energy density of the cell. However, when the coating density increases, so too does the internal impedance of the cell. High-density coating results in higher impedances within the cell. The higher impedances limit the maximum charge and discharge rate capability of the cell.

Embodiments of the disclosure contemplate that charging such cells is most efficient when it occurs between certain energy storage thresholds. Illustrating by example, for a 1600 milliamp-hour cell, embodiments of the disclosure contemplate that efficiency is maximized when the cell is charged between a minimum threshold where there is insufficient energy to power the electronic device, and a reduced energy storage capacity, such as eighty percent of the maximum energy storage capacity. Accordingly, in one or more embodiments, an auxiliary energy delivery device is configured to only deliver energy to a primary energy storage device up to a predefined threshold that is X times the energy storage capacity of the primary energy storage device, where X is a number between zero and one. In one embodiment, X is about 0.8. Thus, for a 1600 milliamp-hour cell as the primary energy storage device, in one or more embodiments the auxiliary energy storage device only delivers energy to the primary energy storage device when the stored energy within the primary energy storage device is equal to or less than 0.8 times 1600 mAh, or 1280 mAh.

Figure 14:
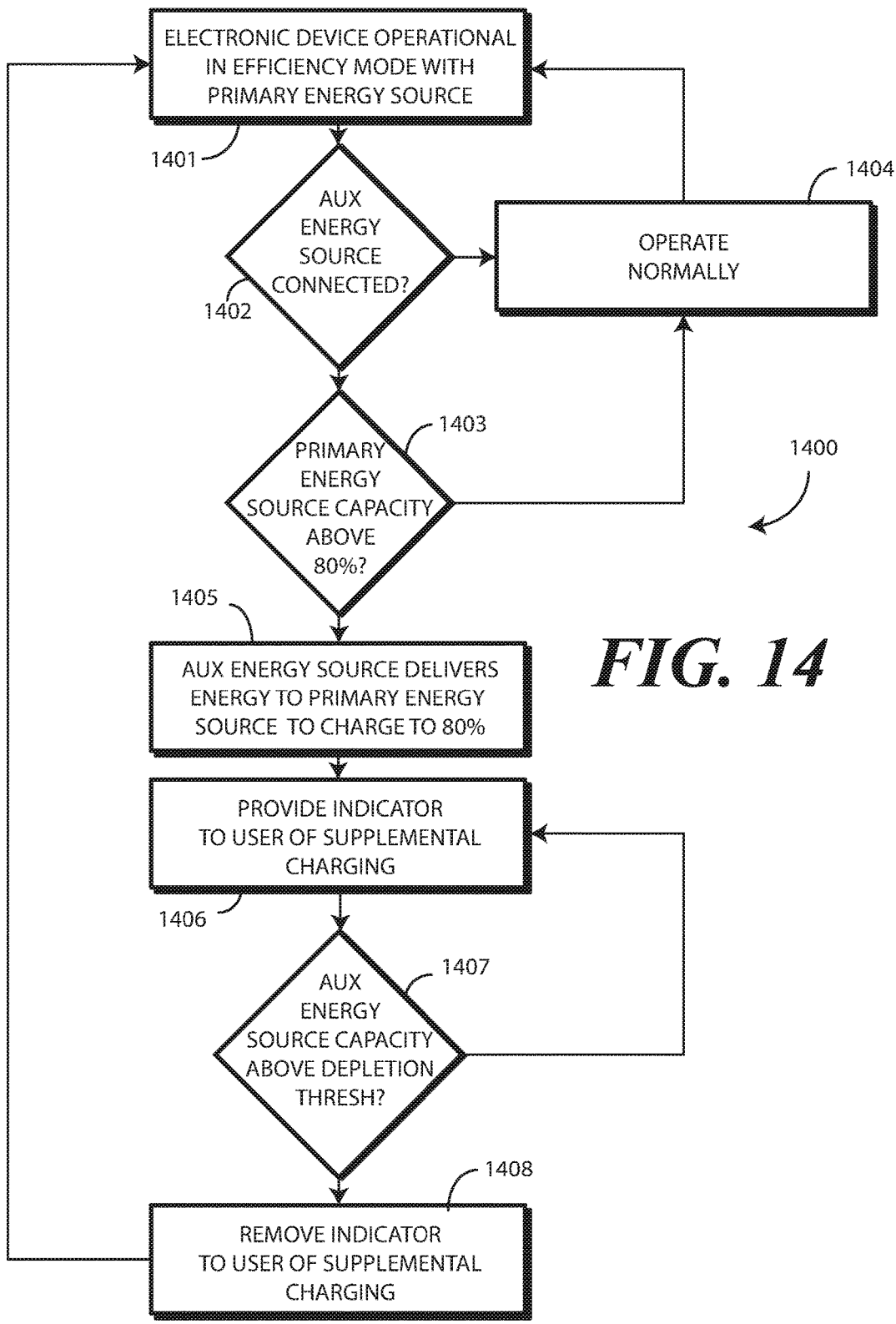
FIG. 14 illustrates another explanatory method in accordance with one or more embodiments of the disclosure.
Figure 15:
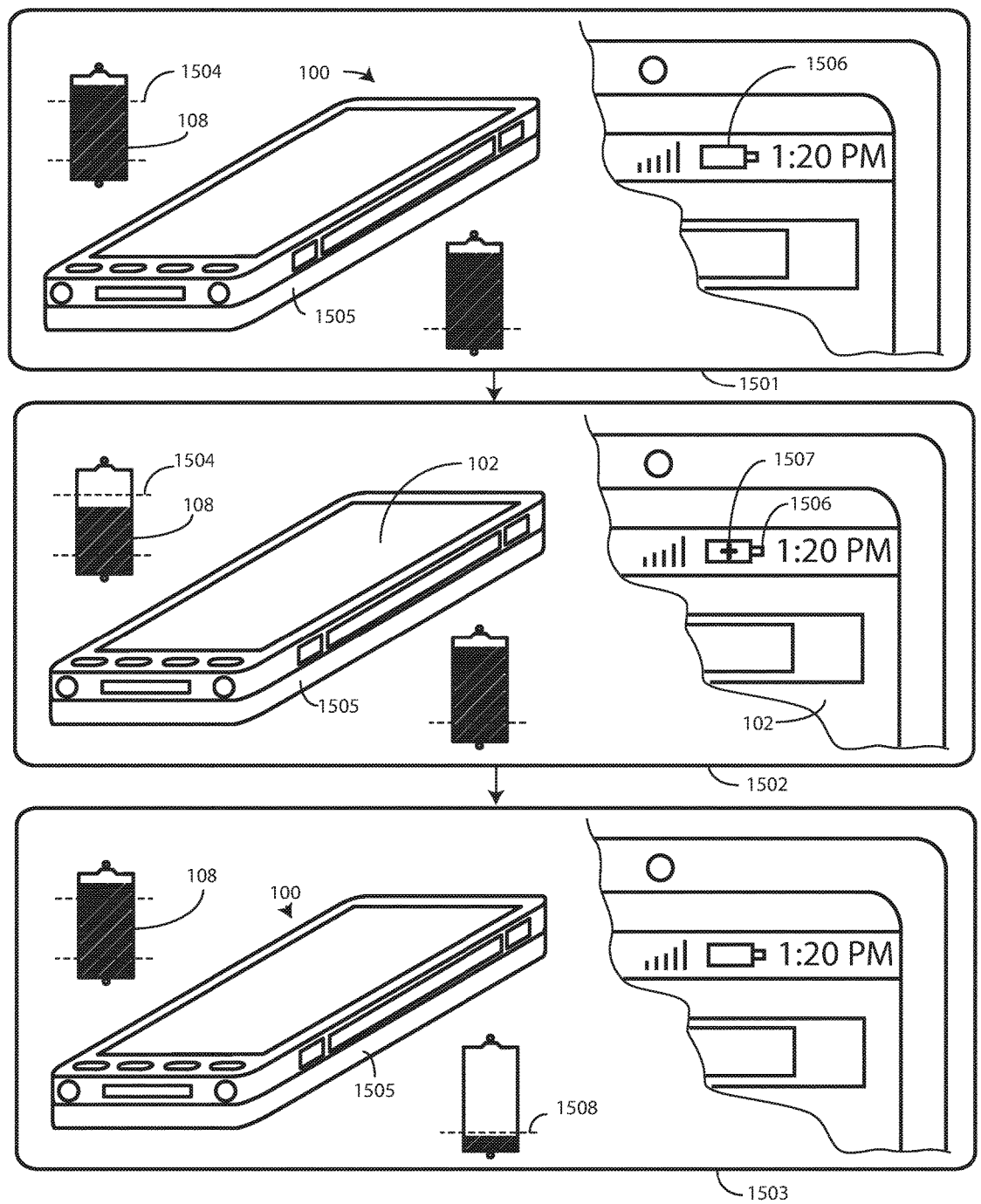
FIG. 15 illustrates one or more method steps in accordance with one or more embodiments of the disclosure.

In one or more embodiments, the user can select whether to fully charge the primary energy storage device, as was the case in the embodiments of FIG. 6 and FIG. 13, or to only charge the primary energy storage device to this predefined threshold. This latter mode of operation is known as the "efficiency" mode of operation because it represents a state of the primary energy storage device where charging is most efficient. Turning now to FIGS. 14 and 15, explanatory methods of operating in the efficiency mode will be described in more detail.

Turning first to FIG. 14, at step 1401 the method 1400 determines, with one or more processors (104) of an electronic device (100), whether the electronic device (100) is operating in the efficiency mode of operation. As noted above, in one or more embodiments, a user can select this mode of operation by entering user input at the user interface (107). In other embodiments, this can be a default mode of operation. Other options for selecting the efficiency mode of operation will be obvious to those of ordinary skill in the art having the benefit of this disclosure. Where the electronic device (100) is not operating in the efficiency mode of operation, the method (600) of FIG. 6 would apply.

Where the electronic device (100) is operating in the efficiency mode of operation, decision 1402 includes detecting, with one or more processors (104) of an electronic device (100), that an auxiliary energy delivery device (203) is electrically coupled to a primary energy storage device (108) of the electronic device (100). Illustrating by example, where the electronic device (100) includes a connector array (344), the one or more processors (104) can detect that the auxiliary energy delivery device (203) is electrically coupled to the primary energy storage device (108) when a mating connector array (345) is electrically coupled to the connector array (344). Similarly, the one or more processors (104) can detect that the auxiliary energy delivery device (203) is electrically coupled to the primary energy storage device (108) via electrical signals and/or a charging current (346) delivered from the auxiliary energy delivery device (203) to the primary energy storage device (108) using the connector array (344) and the mating connector array (345). Other techniques for determining that the auxiliary energy delivery device (203) is electrically coupled to the primary energy storage device (108) will be obvious to those of ordinary skill in the art having the benefit of this disclosure.

Where the auxiliary energy delivery device (203) is electrically coupled to the primary energy storage device (108), the method 1400 proceeds to decision 1403 to determine whether an energy storage capacity of the primary energy storage device (108) exceeds a predefined threshold. In one or more embodiments, the predefined threshold is X times an energy storage capacity of the primary energy storage device (108), wherein X is a number between zero and one. In one embodiment, X is about 0.8.

Where the stored energy is above the predefined threshold, the electronic device (100) functions normally at step 1404. Otherwise, the method 1400 proceeds to step 1405.

At step 1405, the method 1400 detects, with a sensor circuit, that the auxiliary energy delivery device (203) is delivering energy to the primary energy storage device (108). Illustrating by example, in one or more embodiments step 1405 comprises detecting, with a sensor circuit operable with the one or more processors (104) of the electronic device (100), a charging current (346) flowing from the auxiliary energy delivery device (203) to the primary energy storage device (108).

At step 1406, the method 1400 comprises presenting, with the one or more processors (104), a visual indicator on a display (102) of the electronic device (100). In one or more embodiments, the visual indicator indicates that the auxiliary energy delivery device (203) is delivering energy to the primary energy storage device (108). In one or more embodiments, the visual indicator is presented at step 1406 only when the charging current (346) is flowing from the auxiliary energy delivery device (203) to the primary energy storage device (108) and the stored energy within the primary energy storage device (108) is below the predefined threshold. This is true because, in one embodiment, step 1405 further comprises terminating delivery of the energy from the auxiliary energy delivery device (203) to the primary energy storage device (108) when a state of charge of the primary energy storage device (108) reaches a predefined threshold. Accordingly, step 1406 would include removing, for example, the plus sign from the image of the battery when the state of charge of the primary energy storage device (108) exceeds the predefined threshold.

At decision 1407, the method 1400 determines, with one or more processors (104) of the electronic device (100), whether the amount of energy stored in the auxiliary energy delivery device (203) has fallen below a predefined threshold. Where the auxiliary energy delivery device (203) comprises a charger or power supply, decision 1407 can be omitted. However, where the auxiliary energy delivery device (203) comprises an electrochemical cell, such as a lithium-ion or lithium-polymer cell, there will be a predefined threshold, such as 3.8 volts in a single cell application, where the auxiliary energy delivery device (203) has insufficient energy to charge the primary energy storage device (108). Accordingly, in one or more embodiments decision 1407 comprises determining that a voltage of the auxiliary energy delivery device has fallen below a predefined voltage threshold.

Where this occurs, at step 1408, in one embodiment the method 1400 comprises removing, with the one or more processors (104), the visual indicator from a display (102) of the electronic device (100). In one or more embodiments, the removal of the visual indicator indicates that the auxiliary energy delivery device (203) is no longer delivering energy to the primary energy storage device (108).

The method 1400 of FIG. 14 is shown graphically in FIG. 15. Turning now to FIG. 15, at step 1501 the primary energy storage device 108 has stored energy exceeding the predefined threshold 1504. Accordingly, the one or more processors (104) of the electronic device 100 terminate delivery of the energy from the auxiliary energy delivery device 1505 to the primary energy storage device 108. This occurs because the state of charge of the primary energy storage device 108 has reached, or exceeds, the predefined threshold 1504.

When this state is true, the one or more processors remove any icon from the graphical representation 1506 of the primary energy storage device 108. As shown at step 1501, no icon appears in the graphical representation 1506 of the primary energy storage device 108.

By contrast, at step 1502, the state of charge of the primary energy storage device 108 has fallen below the predefined threshold 1504, which in this illustrative embodiment is about eighty percent of a maximum energy storage capacity of the primary energy storage device 108. Accordingly, the auxiliary energy delivery device 1505 begins delivering energy to the primary energy storage device. The one or more processors (104) therefore present an icon 1507 that is at least partially superimposed upon the graphical representation 1506 of the primary energy storage device 108 on the display 102.

Turning to step 1503, the stored energy in the auxiliary energy delivery device 1505 has fallen below the predefined threshold 1508. In one or more embodiments, the one or more processors (104) of the electronic device 100 detect this. When this is detected, the one or more processors (104) then remove the icon 1507 from the graphical representation 1506 of the primary energy storage device 108 in response to determining the amount of energy stored in the auxiliary energy delivery device 1505 has fallen below the predefined threshold 1508. This alerts the user to the fact that the auxiliary energy delivery device 1505 requires recharging.

Figure 16:
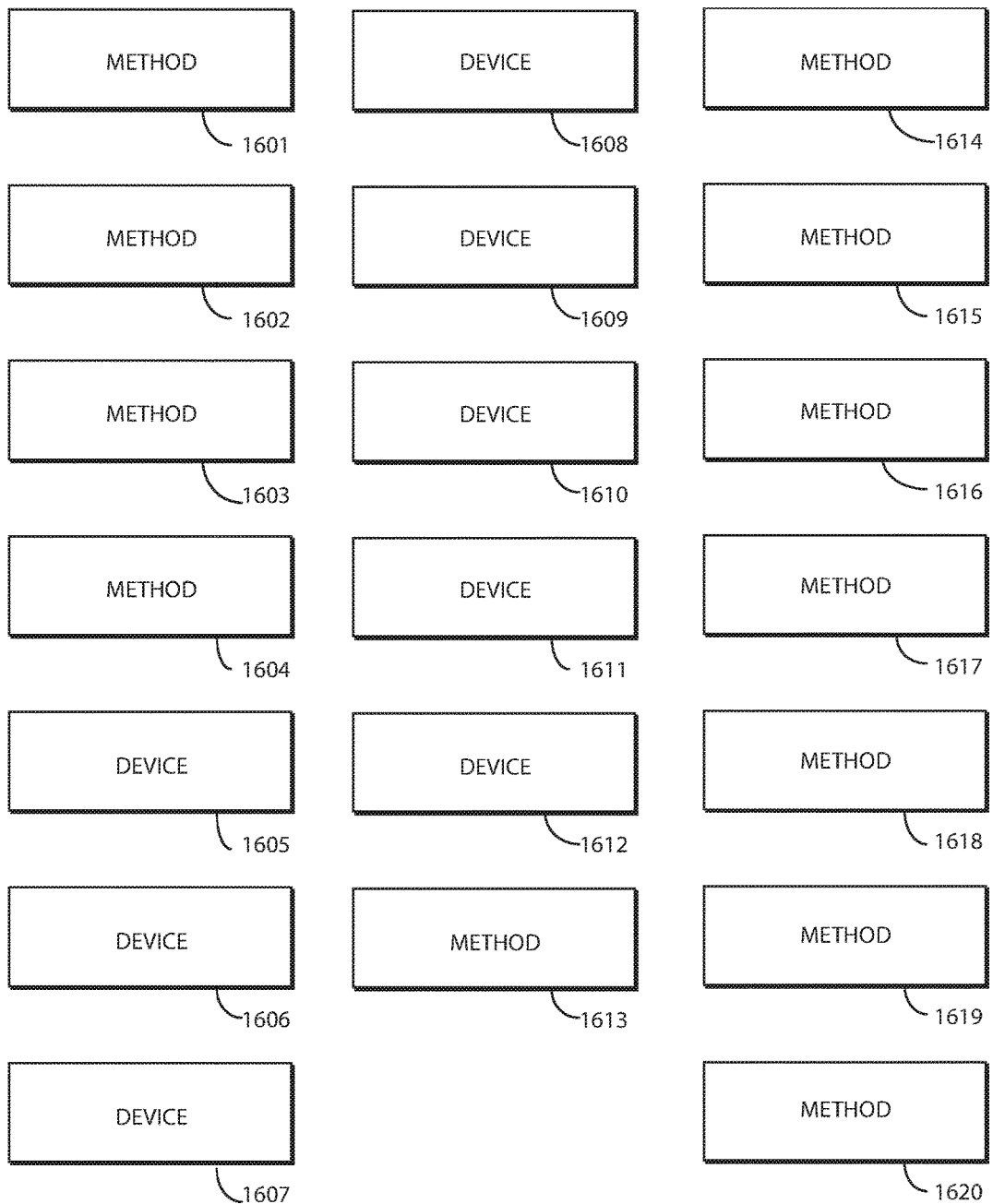
FIG. 16 illustrates various embodiments of the disclosure.

Turning now to FIG. 16, illustrated therein are various embodiments of the disclosure. At 1601, a method comprises detecting, with one or more processors of an electronic device, a charging current flowing from an auxiliary energy delivery device to a primary energy storage device of the electronic device. At 1601, the method also includes presenting, on a display of the electronic device with the one or more processors, a plus sign at least partially within an image of a battery to indicate the auxiliary energy delivery device is delivering energy to the primary energy storage device. At 1604, the plus sign of 1601 overlaps, but is offset from, the image of the battery.

At 1602, the method of 1601 further includes determining, with the one or more processors, an amount of energy stored in the auxiliary energy delivery device falls below a predefined threshold. At 1602, the method of 1601 further includes removing the plus sign from the image of the battery in response to determining the amount of energy stored in the auxiliary energy delivery device has fallen below the predefined threshold.

At 1603, the method of 1601 further includes operating, with the one or more processors, the electronic device in an efficiency mode of operation. At 1603, the method of 1601 further includes terminating delivery of the energy from the auxiliary energy delivery device to the primary energy storage device when a state of charge of the primary energy storage device reaches a predefined threshold and removing the plus sign from the image of the battery.

At 1605, an electronic device comprises one or more processors, a display, operable with the one or more processors, a primary energy storage device, operable to power the one or more processors, and an auxiliary energy delivery device, selectively delivering energy to the primary energy storage device. At 1605, the one or more processors present an icon at least partially superimposed upon a graphical representation of the primary energy storage device on the display when the auxiliary energy delivery device delivers the energy to the primary energy storage device.

At 1606, the icon of 1605 is only partially disposed within an outer boundary of the graphical representation of the primary energy storage device. At 1607, the graphical representation of the primary energy storage device at 1605 comprises an image of a battery, while the icon comprises one of a plus sign, a lightning bolt image, a plug for an alternating current outlet image, or a turbine image.

At 1608, the primary energy storage device of 1607 comprises an electrochemical cell, while the auxiliary energy delivery device comprises one of another electrochemical cell, a power supply, another electronic device, or a charger. At 1609, the auxiliary energy delivery device of 1608 comprises another electrochemical cell disposed within an attachment that is selectively attachable to the electronic device by one or more coupling devices.

At 1610, the one or more processors of 1609 further operate in an efficiency mode of operation. At 1610, the one or more processors of 1609 terminate delivery of the energy from the auxiliary energy delivery device to the primary energy storage device when a state of charge of the primary energy storage device reaches a predefined threshold, and removing the plus sign from the image of the battery. At 1611, the predefined threshold of 1610 comprises X times an energy storage capacity of the primary energy storage device, wherein X is a number between zero and one. At 1612, X from 1611 is about 0.8.

At 1613, a method comprises detecting, with one or more processors of an electronic device, an auxiliary energy delivery device electrically coupled to a primary energy storage device of the electronic device. At 1613, the method includes detecting, with a sensor circuit operable with the one or more processors, a charging current flowing from the auxiliary energy delivery device to the primary energy storage device. At 1613, the method includes presenting, with the one or more processors, a visual indicator on a display of the electronic device, the visual indicator indicating that the auxiliary energy delivery device is delivering energy to the primary energy storage device. In one embodiment, the visual indicator of 1613 is indented into a graphical representation of the primary energy storage device.

At 1614, the visual indicator of 1613 comprises a plus sign. At 1615, the graphical representation of the primary energy storage device at 1614 comprises an image of a battery. At 1616, the plus sign of 1615 is situated in a concave recess of the image of the battery. At 1617, the plus sign of 1616 is presented only when the charging current is flowing from the auxiliary energy delivery device to the primary energy storage device.

At 1618, the method of 1616 further comprises determining, with the one or more processors, an amount of energy stored in the auxiliary energy delivery device falls below a predefined threshold and removing the plus sign and an indentation from the image of the battery. At 1619, the determining the amount of energy stored in the auxiliary energy delivery device falls below the predefined threshold at 1618 comprises determining that a voltage of the auxiliary energy delivery device has fallen below a predefined voltage threshold. At 1620, the image of the battery at 1619 indicates a state of charge of the primary energy storage device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method, comprising:
    detecting, with one or more processors of an electronic device, a charging current flowing from an auxiliary energy delivery device to a primary energy storage device of the electronic device; and
    presenting, on a display of the electronic device with the one or more processors, a plus sign at least partially within an image of a battery to indicate the auxiliary energy delivery device is delivering energy to the primary energy storage device.

2. The method of claim 1, further comprising:
    determining, with the one or more processors, an amount of energy stored in the auxiliary energy delivery device falls below a predefined threshold; and
    removing the plus sign from the image of the battery in response to determining the amount of energy stored in the auxiliary energy delivery device has fallen below the predefined threshold.

3. The method of claim 1, further comprising:
    operating, with the one or more processors, the electronic device in an efficiency mode of operation;
    terminating delivery of the energy from the auxiliary energy delivery device to the primary energy storage device when a state of charge of the primary energy storage device reaches a predefined threshold; and
removing the plus sign from the image of the battery.

4. The method of claim 3, wherein the plus sign overlaps, but is offset from, the image of the battery.

5. An electronic device, comprising:
one or more processors;
a display, operable with the one or more processors;
a primary energy storage device, operable to power the one or more processors; and
an auxiliary energy delivery device, selectively delivering energy to the primary energy storage device;
the one or more processors presenting an icon at least partially superimposed upon a graphical representation of the primary energy storage device on the display when the auxiliary energy delivery device delivers the energy to the primary energy storage device;
wherein the graphical representation of the primary energy storage device comprises an image of a battery and the icon comprises one of a plus sign, a lightning bolt image, a plug for an alternating current outlet image, or a turbine image.

6. The electronic device of claim 5, wherein the icon is only partially disposed within an outer boundary of the graphical representation of the primary energy storage device.

7. The electronic device of claim 5, wherein
the icon is circumscribed with a circle.

8. The electronic device of claim 5, wherein:
the primary energy storage device comprises an electrochemical cell; and
the auxiliary energy delivery device comprises one of:
another electrochemical cell;
a power supply;
another electronic device; or
a charger.

9. The electronic device of claim 8, wherein the auxiliary energy delivery device comprises the another electrochemical cell disposed within an attachment that is selectively attachable to the electronic device by one or more coupling devices.

10. The electronic device of claim 9, the one or more processors further operating in an efficiency mode of operation, terminating delivery of the energy from the auxiliary energy delivery device to the primary energy storage device when a state of charge of the primary energy storage device reaches a predefined threshold, and removing the plus sign from the image of the battery.

11. The electronic device of claim 10, the predefined threshold comprising X times an energy storage capacity of the primary energy storage device, wherein X is a number between zero and one.

12. The electronic device of claim 11, wherein X is about 0.8.

13. A method, comprising:
detecting, with one or more processors of an electronic device, an auxiliary energy delivery device electrically coupled to a primary energy storage device of the electronic device;
detecting, with a sensor circuit operable with the one or more processors, a charging current flowing from the auxiliary energy delivery device to the primary energy storage device; and
presenting, with the one or more processors, a visual indicator on a display of the electronic device, the visual indicator indicating that the auxiliary energy delivery device is delivering energy to the primary energy storage device;
wherein the visual indicator is indented into a graphical representation of the primary energy storage device;
wherein the visual indicator comprises a plus sign.

14. The method of claim 13, wherein the visual indicator overlaps an end of the graphical representation of the primary energy storage device.

15. The method of claim 13, wherein the graphical representation of the primary energy storage device comprises an image of a battery.

16. The method of claim 15, wherein the plus sign is situated in a concave recess of the image of the battery.

17. The method of claim 16, wherein the plus sign is presented only when the charging current is flowing from the auxiliary energy delivery device to the primary energy storage device.

18. The method of claim 16, further comprising:
determining, with the one or more processors, an amount of energy stored in the auxiliary energy delivery device falls below a predefined threshold; and
removing the plus sign and an indentation from the image of the battery.

19. The method of claim 18, wherein the determining the amount of energy stored in the auxiliary energy delivery device falls below the predefined threshold comprises determining that a voltage of the auxiliary energy delivery device has fallen below a predefined voltage threshold.

20. The method of claim 19, wherein the image of the battery indicates a state of charge of the primary energy storage device.

* * * * *